United States Patent [19]

Lee

[11] Patent Number: 5,317,659
[45] Date of Patent: May 31, 1994

[54] CONICAL FIBEROPTIC SWITCH

[75] Inventor: Ho-Shang Lee, El Sobrante, Calif.

[73] Assignee: Dicon Fiberoptics, Berkeley, Calif.

[21] Appl. No.: 15,458

[22] Filed: Feb. 9, 1993

[51] Int. Cl.$^5$ .............................................. G02B 6/26
[52] U.S. Cl. ........................................ 385/22; 385/20
[58] Field of Search ................... 385/15, 16, 18, 20, 385/21, 22, 25, 26

[56] References Cited

U.S. PATENT DOCUMENTS

| | | | |
|---|---|---|---|
| 4,193,662 | 3/1980 | Hara | 385/22 |
| 4,378,144 | 3/1983 | Duck et al. | 350/96.18 |
| 4,657,339 | 4/1987 | Fick | 385/20 |
| 4,834,488 | 5/1989 | Lee | 350/96.2 |
| 4,896,935 | 1/1990 | Lee | 350/96.2 |

Primary Examiner—Rodney B. Bovernick
Assistant Examiner—John Ngo
Attorney, Agent, or Firm—Majestic, Parsons, Siebert & Hsue

[57] ABSTRACT

The end portions of a number of optical cables each having one or more optical fibers are fixed onto the conical surface of a supporting frame. The end portion of a movable cable with one or more optical fibers is rotated about the axis of the conical surface so that its end portion is aligned with one of the fixed cables and so that the fibers in the movable cable are optically aligned with the fibers in such fixed cable. The movable cable is rotated by a stepping motor to accomplish the switching action.

6 Claims, 4 Drawing Sheets

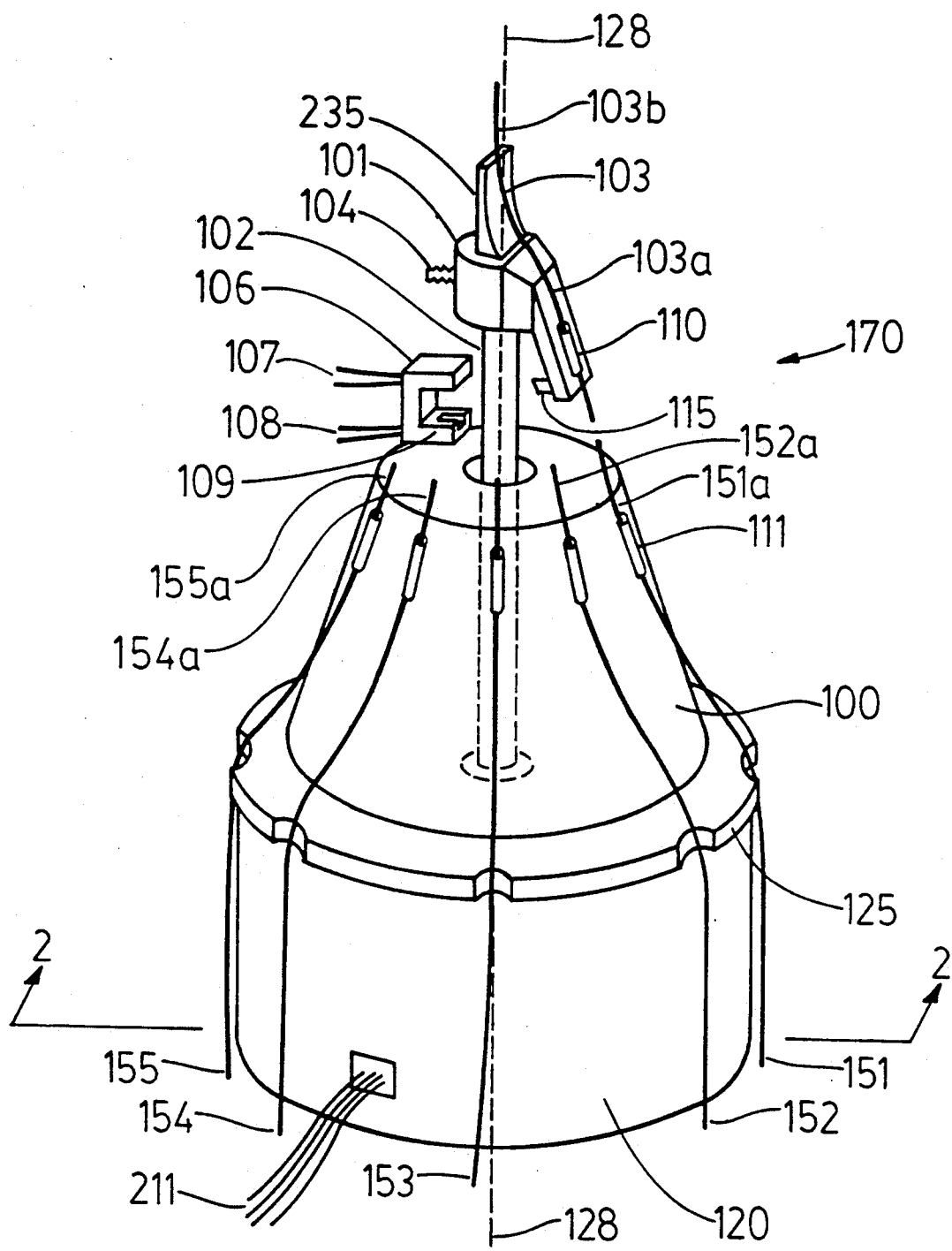
FIG._1.

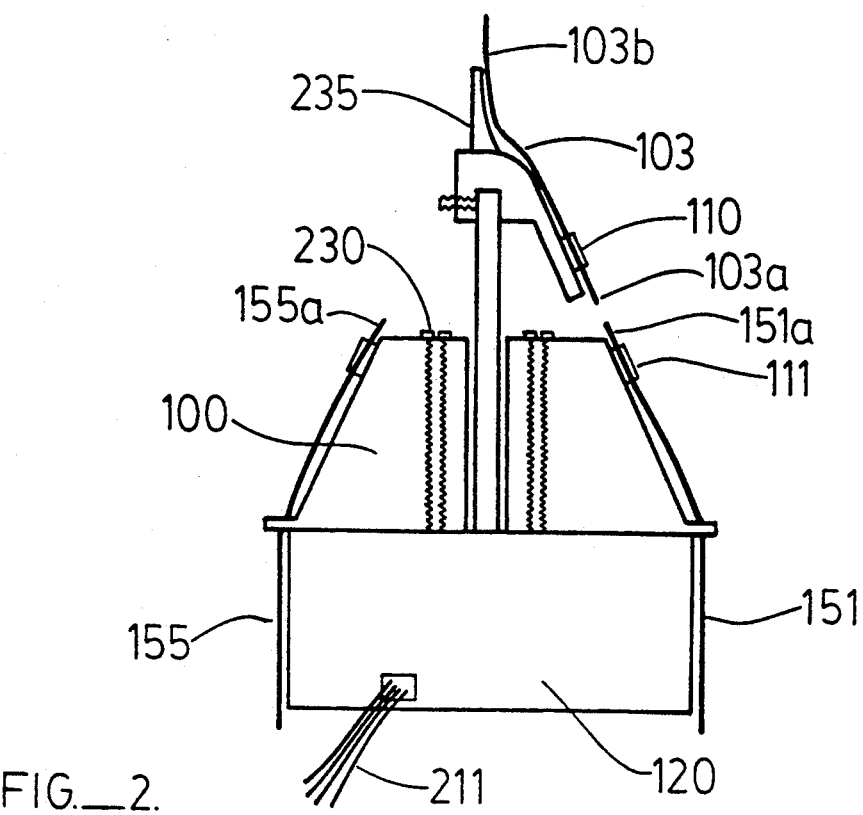
FIG._2.
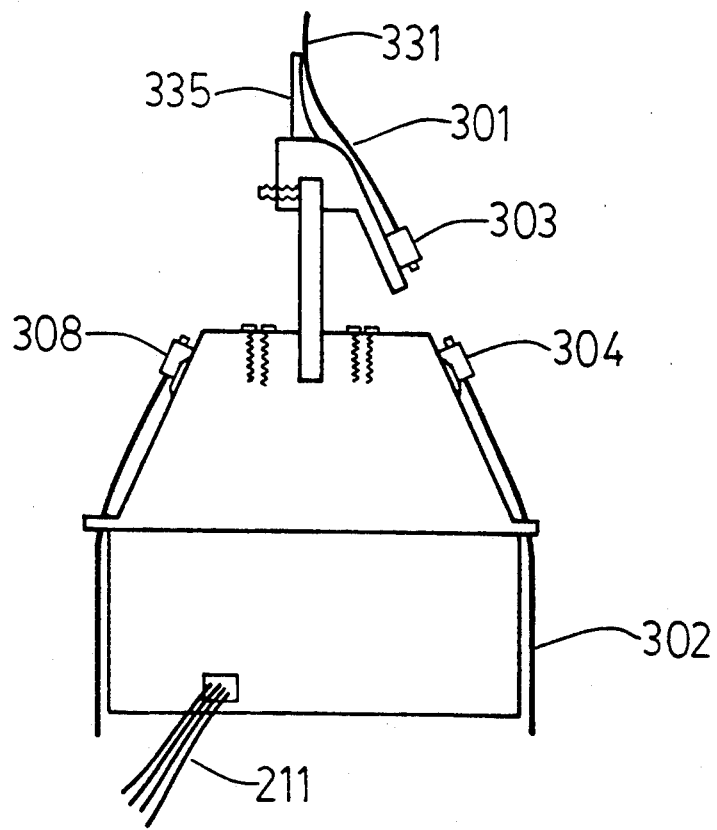
FIG._3.

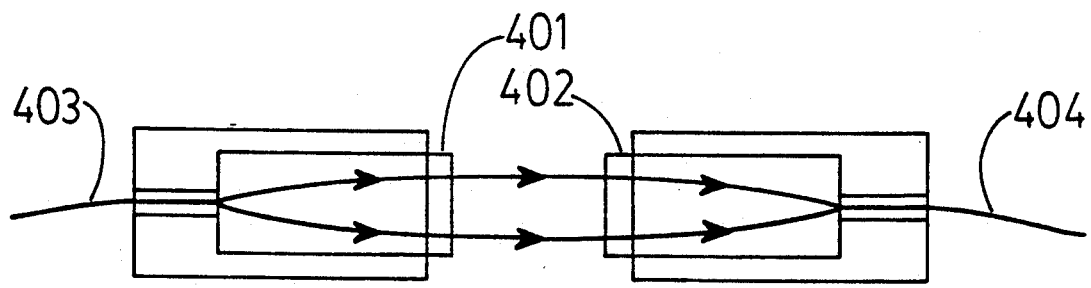
FIG._4.
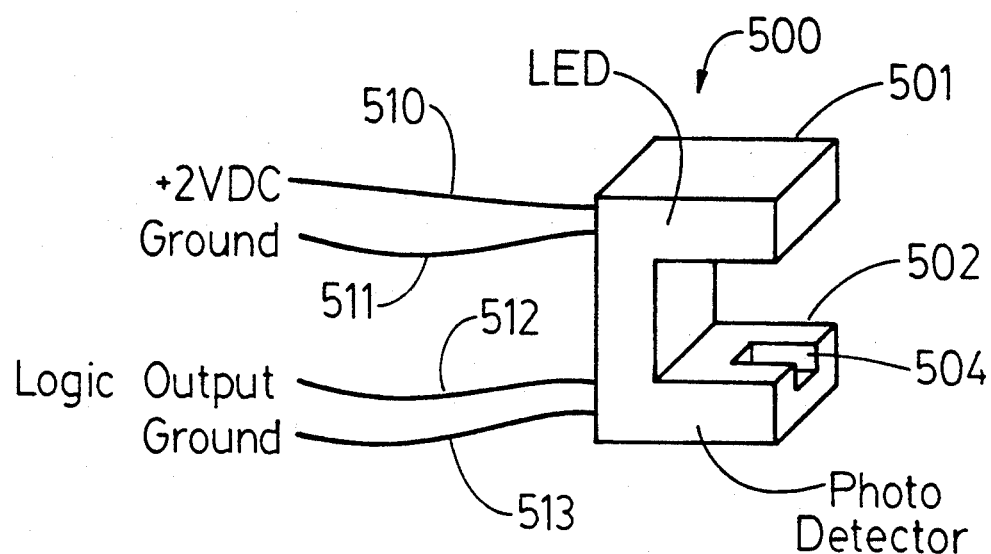
FIG._5.
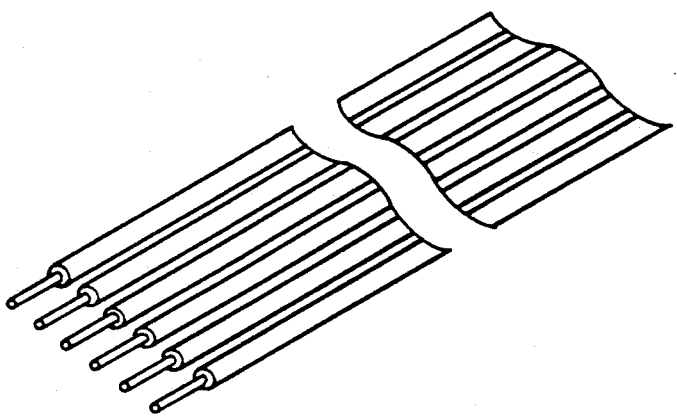
FIG._7.

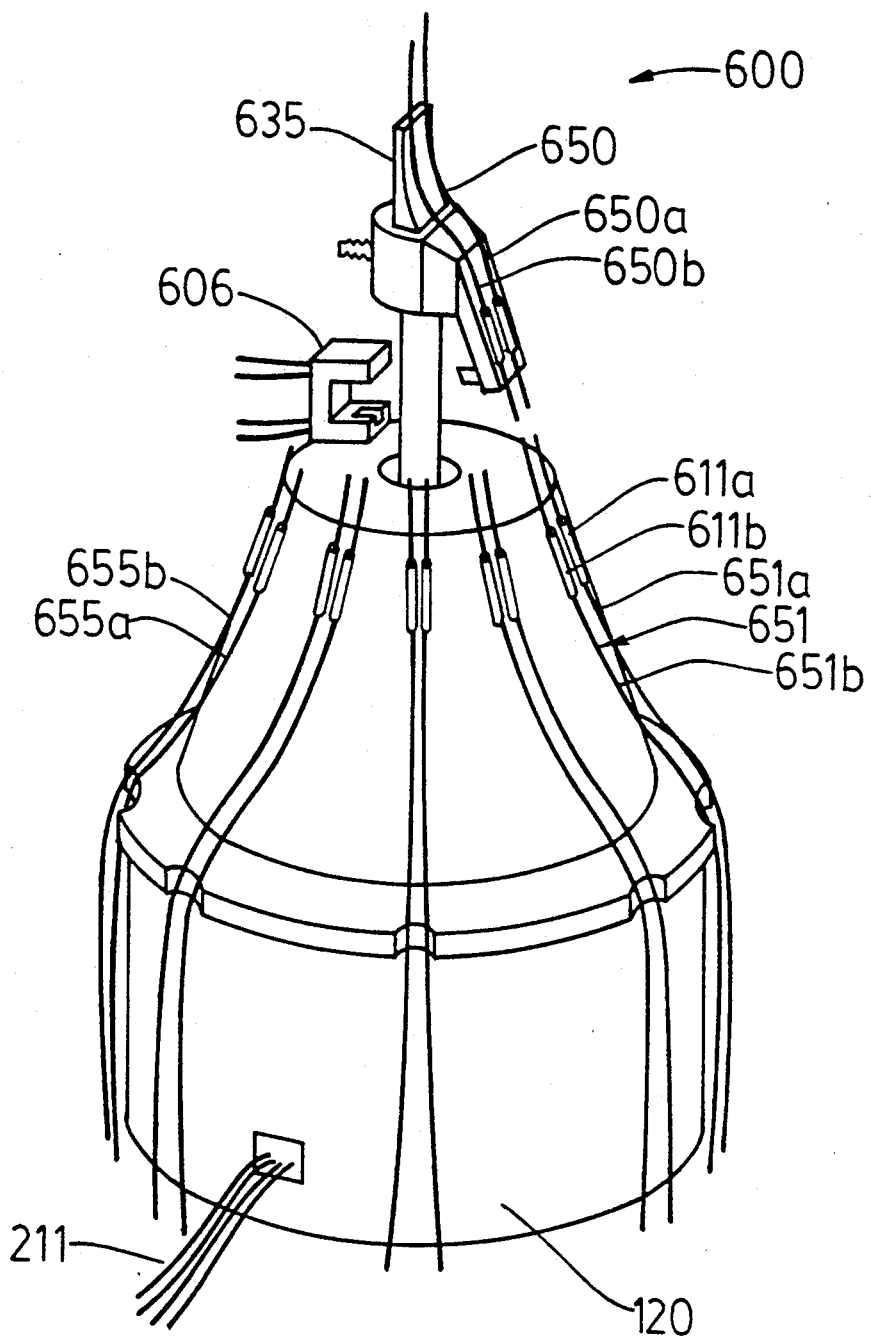
FIG._6.

CONICAL FIBEROPTIC SWITCH

BACKGROUND OF THE INVENTION

This invention relates in general to optical switches, and more specifically, to a conical fiberoptic switch.

With the advance of fiberoptic technology, information signals have been increasingly transmitted through optical fibers. Signal transmission through optical fibers has significant advantages over electrical transmission methods. Signals transmitted optically are not disturbed by electromagnetic noise. Use of optical fibers is advantageous in many environments where the use of metal electrical conductors is undesirable, such as in chemically active and corrosive environments.

As in electrical signal transmission, it is frequently necessary in optical signal transmission to change the transmission path of information signals by switches. In some applications, it is necessary to have the option of connecting one fiber with either one of two other fibers. In other applications, it may be necessary to exchange the connection between two input fibers and two output fibers. In still other applications, it may be necessary to select a connection between one fiber and a number of other fibers. Therefore, it is desirable to provide a wide variety of optical switches capable of performing different functions.

Two types of optic fibers have been used: multimode and single mode. While multimode fibers have good light-gathering ability, the wider diameter of the multimode fiber allows diverse internal zigzag paths which may cause mode dispersion. The mode dispersion caused limits the useful bandwidth transmitted. With narrower diameters than the multimode fibers, single-mode fibers can transmit very wide bandwidths. Multimode fibers, however, are less disturbed by misalignment than single-mode fibers. Therefore, while a misalignment of a few microns may cause negligible transmission loss in multimode fibers, the same misalignment may cause irretrievable information loss when single-mode fibers are used. Therefore, one common problem of conventional optical switches is misalignment of the fibers connected by the switches. It is therefore desirable to provide fiberoptic switches which can accurately align input and output fibers. It is also desirable to provide fiberoptic switches that are inexpensive and easy to use.

One conventional optical switch is described in U.S. Pat. Nos. 4,834,488 and 4,896,935. As shown in FIGS. 9 and 11 of these two patents, one conventional design envisions the use of a number of fixed fibers and one movable fiber which may be rotated to be in optical alignment with one of the fixed fibers. The movable fiber and the fixed fibers are all located in the same plane. In some applications, it may be cumbersome to have to rotate the movable fiber by large angles. This is particularly true where it is desirable to align, not just one movable fiber with one fixed fiber at a time, but to align a group of fibers with another group of fixed fibers amongst a number of groups of fixed fibers at one time.

Another type of fiberoptic switch is disclosed in U.S. Pat. No. 4,378,144 to Duck et al. Duck et al. discloses an optical switch in which a number of output fibers is arranged parallel to the axis of a stepping motor and around a pitch circle centered at the axis of the motor. An input fiber is rotated about the axis of the stepping motor to be at one of a number of switching positions along the pitch circle so as to be aligned with one of the output fibers. The above-described design by Duck et al. is disadvantageous for many reasons. Since the output fibers are arranged parallel to the axis of the stepping motor and surround the stepping motor and since the input fiber is rotated along the circumference of the pitch circle to be aligned with the output fibers, Duck et al.'s device occupies considerable space and may be impractical for switching applications requiring a physically small device. Furthermore, in such an arrangement, the diameter of rotation of the input fiber by the stepping motor becomes a limiting factor in regard to the accuracy of alignment. Since the input fiber is spaced apart from the axis of the motor at a distance that must be at least as great as the radius of the stepping motor, any variations in angular displacement of the stepping motor will cause significant alignment errors.

In view of the reasons above, it is desirable to provide an improved optical switch in which the above-described difficulties are alleviated.

SUMMARY OF THE INVENTION

The above difficulties are overcome by providing a conically-shaped fiberoptic switch. Different from the design in U.S. Pat. Nos. 4,834,488 and 4,896,935, the conical switch proposed herein does not require significant lateral motion of the movable fiber or fiberoptic cable; only an end portion of the movable fiber is rotated around a conical surface, without requiring the remaining portion of the movable fiber to be moved laterally. By employing a conical design, only a small portion of the input movable fiber need to be rotated, so that the radius of rotation of the portion can be much smaller than the radius of the stepping motor. Hence alignment errors caused by errors in angular displacement of the stepping motor will be reduced relative to those in Duck et al.'s design so that a more compact design is possible.

This invention is directed towards an optical switching device comprising n fixed optical fiber cables and a movable optical fiber cable, each of the fixed and movable cables having an end portion and each of the fixed and movable cables including at least one optical fiber that has an end portion, where n is an integer greater than 1. The n cables are located so that the end portion of each fixed cable lies substantially on a conical surface having an axis and the end portion of the optical fiber in each cable is optically aligned with a point on said axis. The end portion of the movable optical fiber is rotatable about said axis and is at an angle to the axis so that it is also substantially on the conical surface when rotated about said axis. The optical switching device further comprises a stepping motor for rotating the rotatable end portion about the axis and a stepping motor control system for controlling the rotation of the stepping motor to align the rotatable end portion of the movable cable with the end portion of any one of the n fixed cables, so that the stepping motor rotates the end portion of the movable cable by one of n preset numbers of steps, each of said n numbers of steps corresponding to the position of the end portion of a fixed cable, so that when the rotatable end portion of the movable cable is rotated by a number of steps selected from said n numbers of steps, the end portion of the optical fiber in the movable cable will be substantially optically aligned with the end portion of the optical fiber in the fixed cable whose position corresponds to said selected number of steps.

BRIEF DESCRIPTION OF THE DRAWINGS

FIG. 1 is a perspective view of a conical fiberoptic switch to illustrate one embodiment of the invention.

FIG. 2 is a cross-sectional view of the conical fiberoptic switch of FIG. 1 taken along line 2—2 in FIG. 1.

FIG. 3 is a cross-sectional view of a conical fiberoptic switch to illustrate another embodiment of the invention.

FIG. 4 is a cross-sectional view of a device for optical coupling a pair of optical fibers using a pair of gradient index lenses that may be employed in the invention.

FIG. 5 is a perspective view of an optical proximity switch useful for the invention.

FIG. 6 is a perspective view of a conical switch, which can optically switch a group of optical fibers to another group, to illustrate yet another embodiment of this invention.

FIG. 7 is a perspective view of a ribbon cable comprising six optical fibers to illustrate the invention.

DESCRIPTION OF THE PREFERRED EMBODIMENT

The invention is to provide a compact and easy-to-fabricate fiberoptic switch, which can be extended to facilitate the switching of a multi-fiber ribbon cable. End portions of the common fiber and all the output fibers are arranged in a conical surface. As shown in FIG. 1, the common fiber 103 is capable of optically connecting to any one of output fibers such as fibers 151-155. FIG. 1 shows the perspective view of a conical optical switch illustrating the present invention. The conical main frame 100 is contiguous to a stepping motor 120. A rotary pin 101 is mounted on the top of the motor shaft 102 of the stepping motor by a set screw 104. The end portion 103a of a common movable fiber 103 is inserted in a tubing segment 110, which is glued or welded to the rotary pin 101. Tubing segment 110 is at such angle to pin 101 that portion 103a is at an angle to the axis 128 of shaft 102 of motor 120 so that, when rotated about axis 128, portion 103a is substantially on a conical surface common to end portions of fixed fibers 151-155 described below. Similarly, the end portions 151a-155a of output fibers 151-155 are inserted into tubing segments 111 which are glued or welded to the conical surface of frame 100. The conical surface of frame 100 has axis 128. The end portions 151a-155a of output fibers, such as fibers 151-155, are thus fixed at predetermined positions relative to the conical surface of main frame 100. Five output fibers 151-155 are chosen for the illustration purpose. Other number of outputs fibers are within the scope of the present invention; thus the fibers may be evenly spread to completely surround (not shown) axis 128.

The end portion 103a of common movable fiber 103 is rotated by a stepping motor 120 to predetermined positions on an imaginery conical surface (not shown) which is simply the extension of the conical surface of frame 100 towards the axis 128, so that end portion 103a is substantially optically aligned to the end portion of any of the output fibers 151-155. The axis of rotation of the shaft 102 of the stepping motor is also the axis of the conical surface.

An optical proximity switch 106 is used to park or reset the stepping motor 120. A shutter 115 is attached to the rotary pin 101. The rotary pin 101 is rotated until the shutter 115 blocks a slit 109 of the optical proximity switch 106. The structure of an optical proximity switch is shown in FIG. 5 described below.

One LED (light emitting diode) is contained within one side portion 501 of the proximity switch 500. The other side portion 502 contains a photodetector. A slit 504 is opened above the photodetector. If there is nothing blocking the slit from the LED, the light generated by the LED is received by the photodetector and therefore generates a logic signal output High in the terminal 512. On the contrary, a logic output Low is generated if the slit 504 is blocked. The logic output 512 can be used to control the motion of the stepping motor 120 (e.g. to reset the motor) of FIG. 1 with the help of system 170.

Stepping motor 120 may be controlled so as to rotate the end portion of the movable cable until the fiber therein is aligned with the fiber in a fixed cable designated by the user by means of a control system 170 in FIG. 1 in a manner known to those skilled in the art, such as that described in U.S. Pat. Nos. 4,834,488 and 4,896,935 in reference to FIG. 13 of the two patents. These two patents are incorporated by reference to show such teaching. In this manner, a user may select to align the end portion of the fiber in the movable cable to the fiber in any of the n fixed cables. For simplicity, the connections between system 170 and the other components of FIG. 1 are not shown in FIG. 1.

As shown in FIG. 1, except for the end portion 103a which is at an angle top axis 128, the remaining portion 103b of movable cable 103 is aligned along axis 128 or parallel to the axis with a slight offset (as shown in FIG. 1) by means of a positioning member 235 so that such remaining portion does not move substantially laterally when rotated by motor 120 along axis 128. This makes for a compact design which may be desirable for some applications compared to the designs in U.S. Pat. Nos. 4,378,144; 4,834,488 and 4,896,935.

FIG. 2 is a cross-sectional view of FIG. 1. It shows that the stepping motor 120 is adjacent to the main frame 100 with electrical wires 211 coming out of the main frame. The electrical wires 211 are used to carry the current to the motor 120 for controlling the rotation of the motor. It will be understood, however, that the body of motor 120 may be spaced apart from frame 100 if desired for space considerations, with a long shaft 102 extending from the motor body towards the remaining part of the fiberoptic switch.

In some cases, a gradient index (GRIN) lens can be appended to the fiber end to collimate the optical beam exiting the fiber end. The GRIN lens is a rod-shaped lens with a refractive index profile in the direction perpendicular to the optical axis. The lens is available from Nippon Sheet Glass under the trade name SELFOC. FIG. 4 is a cross-sectional view of a device for optical coupling a pair of optical fibers using a pair of gradient index lenses that may be employed in the invention. The exit beam of the fiber 403 is collimated by a GRIN lens 401 with an appropriate length, such as a quarter pitch. The collimated beam then enters the other GRIN lens 402 and is focused down to the fiber end of the fiber 404. The use of the GRIN lenses reduces the effects of misalignment errors.

FIG. 3 shows a conical fiberoptic switch with GRIN lens appended to each fiber end. This embodiment is same as that in FIG. 2 except that GRIN lenses 303, 304, 308 are added to the fiber ends.

FIG. 6 is a perspective view of another embodiment of conical fiberoptic switch. In this configuration, a pair of common fibers can be optically connected to any output pair. This is a duplex version of the embodiment shown in FIG. 1. In one position as shown in FIG. 6, the ends 650a and 650b of common fiber pair 650 are optically connected to end portions 651a and 651b respectively of one pair of output fibers 651. In the same manner as shown in FIG. 3, all fiber ends can be appended a GRIN lens to collimate the optical beam. Furthermore, multiple fibers can be used as a common fiber group with the same fiber number. All the common movable fiber group and output fixed fiber groups are located in a conical surface.

FIG. 7 shows a six-fiber ribbon cable with one end cleaved to illustrate another example of movable and fixed fiber groups that may be aligned in the manner described above. Similarly, each fiber end in the ribbon fiber can be appended with a GRIN lens.

The invention above has been described by reference to various embodiments. It will be understood that various modifications may be made without departing from the scope of the invention which is to be defined only by the appended claims.

What is claimed is:

1. An optical switching device comprising:
   n fixed optical fiber cables each having an end portion, n being an integer greater than 1, each cable including at least one optical fiber, said n cables located so that the end portion of each cable lies substantially on a conical surface having an axis and the optical fiber in each cable is optically aligned with a point on said axis;
   a movable optical fiber cable having an end portion rotatable about said axis, said movable cable including at least one optical fiber that has an end portion, said end portion of said movable optical cable being at an angle to said axis so that it is also substantially on said conical surface when it is rotated;
   a stepping motor for rotating the rotatable end portion of the movable cable about said axis;
   a stepping motor control system for controlling the rotation of the stepping motor to align the rotatable end portion of the movable cable with any one of the n fixed cables, so that the stepping motor rotates the end portion of the movable cable by one of n preset numbers of steps, each of said n numbers of steps corresponding to the position of the end portion of a fixed cable, so that when the rotatable end portion of the movable cable is rotated by a number of steps selected from said n numbers of steps, the end portion of the optical fiber in the movable cable will be substantially optically aligned with the end portion of the optical fiber in the fixed cable whose position corresponds to said selected number of steps.

2. The device of claim 1, wherein the full length of the movable cable, except for the end portion, is substantially aligned along or parallel to the axis.

3. The device of claim 1, further comprising at least (n+1) GRIN lenses, wherein each GRIN lens is connected to an optical fiber in a fixed or movable cable to collimate light passing from or to such fiber.

4. The device of claim 1, wherein each cable includes two or more optical fibers.

5. The device of claim 4, wherein said fixed and movable cables are ribbon cables, and wherein the fibers in each cable are arranged side-by-side in a ribbon configuration.

6. The device of claim 1, further comprising an optical proximity switch for resetting the stepping motor.

* * * * *